(12) United States Patent
Niefer et al.

(10) Patent No.: US 12,140,241 B2
(45) Date of Patent: Nov. 12, 2024

(54) FLUID CONTROL SYSTEM

(71) Applicant: Festo SE & Co. KG, Esslingen (DE)

(72) Inventors: Daniel Niefer, Kirchheim/Teck (DE); Ute Casimir, Esslingen (DE); Charles Bowers, Livermore, CA (US)

(73) Assignee: Festo SE & Co. KG, Esslingen (DE)

( * ) Notice: Subject to any disclaimer, the term of this patent is extended or adjusted under 35 U.S.C. 154(b) by 448 days.

(21) Appl. No.: 17/328,379

(22) Filed: May 24, 2021

(65) Prior Publication Data

US 2022/0372997 A1    Nov. 24, 2022

(51) Int. Cl.
| | | |
|---|---|---|
| *F16K 27/00* | (2006.01) | |
| *F15B 13/08* | (2006.01) | |
| *F15B 5/00* | (2006.01) | |
| *F16K 31/00* | (2006.01) | |
| *F16K 31/06* | (2006.01) | |

(52) U.S. Cl.
CPC ............ *F16K 27/003* (2013.01); *F15B 5/006* (2013.01); *F15B 13/0817* (2013.01); *F15B 13/0825* (2013.01); *F15B 2211/89* (2013.01); *F16K 31/004* (2013.01); *F16K 31/0603* (2013.01); *Y10T 137/87885* (2015.04)

(58) Field of Classification Search
CPC .... F15B 5/006; F15B 13/086; F15B 13/0896; F15B 13/0807; F15B 13/0825; F15B 13/0817; F15B 2211/50554; F15B 2211/6653; F15B 2211/8855; F15B 2211/89; F15B 2211/30575; F15B 2211/6313; F15B 2211/665; F15B 11/028; F15B 21/048; F16K 7/12; F16K 7/14; F16K 7/17; F16K 27/003; F16K 31/004; F16K 31/0603; F16K 2200/204; Y10T 137/87885
USPC .......................................... 137/544, 884, 883
See application file for complete search history.

(56) References Cited

U.S. PATENT DOCUMENTS

| | | | | |
|---|---|---|---|---|
| 5,605,179 A | * | 2/1997 | Strong, Jr. ............... | F17C 13/04 137/884 |
| 5,819,782 A | * | 10/1998 | Itafuji ................. | F15B 13/0807 137/271 |
| 5,836,355 A | * | 11/1998 | Markulec .............. | F16K 27/003 137/884 |
| 6,035,893 A | * | 3/2000 | Ohmi .................... | F16K 27/003 137/884 |

(Continued)

*Primary Examiner* — Kevin F Murphy
*Assistant Examiner* — Jonathan J Waddy
(74) *Attorney, Agent, or Firm* — Hoffmann & Baron, LLP

(57) ABSTRACT

A fluid control system for supplying fluid to a fluid consumer, having a valve module including a channel body to which a fluid switching valve, a fluid pressure regulator and a vacuum switching valve are attached, the channel body having a first fluid channel extending from a fluid input port to an input port of the fluid pressure regulator and having a second fluid channel extending from an output port of the fluid pressure regulator to an input port of the fluid switching valve, and having a third fluid channel extending from an output port of the fluid switching valve to a fluid consumer port, and having a first vacuum channel extending from a vacuum input port to an input port of the vacuum switching valve, and having a second vacuum channel extending from an output port of the vacuum switching valve to the fluid consumer port.

6 Claims, 3 Drawing Sheets

(56) References Cited

U.S. PATENT DOCUMENTS

| Patent/Publication | Date | Inventor | Classification |
|---|---|---|---|
| 6,102,640 A * | 8/2000 | Yokoyama | F15B 13/0825 411/360 |
| 6,273,139 B1 * | 8/2001 | Ohmi | F16K 27/003 137/884 |
| 6,293,310 B1 * | 9/2001 | Redemann | H01J 37/3244 137/884 |
| 6,712,400 B1 * | 3/2004 | Yamaji | F16K 27/003 285/134.1 |
| 8,104,516 B2 * | 1/2012 | Moriya | F17D 1/04 137/884 |
| 9,188,989 B1 * | 11/2015 | Mudd | F16K 47/08 |
| 9,507,352 B2 * | 11/2016 | Dohi | F16K 31/52491 |
| 2002/0185185 A1 * | 12/2002 | Yamaji | F16K 27/003 137/884 |
| 2008/0289712 A1 * | 11/2008 | Wodjenski | F17C 13/04 137/883 |
| 2008/0302434 A1 * | 12/2008 | Taskar | F16K 27/003 137/884 |
| 2009/0095354 A1 * | 4/2009 | Taskar | F16L 41/03 137/15.01 |
| 2010/0186842 A1 * | 7/2010 | Eriksson | F16K 27/003 137/884 |
| 2010/0319691 A1 * | 12/2010 | Lurie | A61M 16/0858 128/205.24 |
| 2011/0005601 A1 * | 1/2011 | Shareef | H01L 21/67253 137/861 |
| 2014/0069527 A1 * | 3/2014 | Mudd | G05D 7/0635 137/487 |
| 2014/0230915 A1 * | 8/2014 | Mudd | G05D 7/0647 137/15.08 |
| 2015/0337985 A1 * | 11/2015 | Doya | F16K 49/002 137/334 |
| 2016/0041564 A1 * | 2/2016 | Mudd | G05D 7/0641 700/275 |
| 2016/0047483 A1 * | 2/2016 | Hirose | F16K 27/0236 137/602 |
| 2016/0216713 A1 * | 7/2016 | Mudd | G05D 7/0635 |
| 2016/0327963 A1 * | 11/2016 | Hirata | F16K 31/02 |
| 2017/0328383 A1 * | 11/2017 | Neef | F15B 13/0405 |
| 2018/0004235 A1 * | 1/2018 | Mudd | G05D 7/0635 |
| 2018/0090353 A1 * | 3/2018 | Penley | B05B 12/087 |
| 2018/0246532 A1 * | 8/2018 | Nakamura | G05D 11/132 |

* cited by examiner

FLUID CONTROL SYSTEM

BACKGROUND OF THE INVENTION

The invention relates to a fluid control system for supplying fluid to a fluid consumer.

SUMMARY OF THE INVENTION

According to the invention the fluid control system comprises a valve module including a channel body to which a fluid switching valve, a fluid pressure regulator and a vacuum switching valve are attached, the channel body having a first fluid channel extending from a fluid input port to an input port of the fluid pressure regulator and having to a second fluid channel extending from an output port of the fluid pressure regulator to an input port of the fluid switching valve, and having a third fluid channel extending from an output port of the fluid switching valve to a fluid consumer port, and having a first vacuum channel extending from a vacuum input port to an input port of the vacuum switching valve, and having a second vacuum channel extending from an output port of the vacuum switching valve to the fluid consumer port.

The purpose of the valve module is to provide compressed air and vacuum to a fluid consumer, wherein this fluid consumer may be an actuator which is used to apply a working force to a working object. Therefore the valve module comprises on the one hand several components for handling compressed air, in particular the fluid switching valve and the fluid pressure regulator, and on the other hand a component for handling vacuum, in particular the vacuum switching valve. Both the components for handling compressed air and for handling vacuum are connected indirectly or directly to the fluid consumer port which serves as a connection interface for a connection with the fluid consumer, in particular for a pipe or tube to be connected with the fluid consumer. To ensure a compact design of the valve module all fluid channels which are necessary to connect the respective components of the valve module including the channels for pressurised air and the channels for vacuum are realised as bores in the channel body, therefore no external tubes or pipes are required to connect the components like the fluid switching valve, the fluid pressure regulator and the vacuum switching valve. Furthermore the fluid switching valve and the fluid pressure regulator and the vacuum switching valve are provided as separate function units, each having a housing comprising a fluid interface to be connected to the channel body and further comprising an electric interface to allow an electric operation of the respective function unit.

According to an embodiment of the invention the fluid switching valve, the fluid pressure regulator and the vacuum switching valve are disposed on an upper surface of the channel body and wherein the fluid consumer port is disposed on an end face of the channel body oriented transverse to the upper surface. The upper surface of the channel body may be realised as an even surface with orifices for the respective fluid and vacuum channels. As an alternative the upper surface is at least partially profiled and is adapted to respective interface geometries of the fluid switching valve and/or the fluid pressure regulator and/or the vacuum switching valve. The fluid consumer port is located on an end face or front face of the channel body to ensure an easy connection and disconnection of the fluid consumer to the valve module and from the valve module, respectively.

According to a further embodiment of the invention the fluid switching valve and the fluid pressure regulator are mounted to a first channel body portion of the channel body, the first channel body portion having a first channel body interface and comprising a first portion of the third fluid channel extending there through and terminating at a first orifice of the first channel body interface, and wherein the vacuum switching valve is attached to a second channel body portion of the channel body, the second channel body portion having a second channel body interface and comprising a second portion of the third fluid channel extending there through an terminating at a second orifice of the second channel body interface, the first channel body interface and the second channel body interface being sealingly interconnected with each other.

The separation of the channel body into a first channel body portion and a second channel body portion allows an advantageous maintenance of the valve module, since the components for handling compressed air can be replaced separately from the components for handling the vacuum. The first channel body portion comprises a first channel body interface, on which an orifice of the first portion of the third fluid channel is located. The second channel body portion comprises a second channel body interface, on which an orifice of the second portion of the third fluid channel is located. Preferably the first channel body interface and the second channel body interface are realized as even surfaces which are pressed together to ensure an airtight connection between the two portions of the third fluid channel. Preferably at least one of the orifices is surrounded by a sealing, in particular by an o-ring seal.

According to a further embodiment of the invention a pressure sensor is disposed on the channel body and is electrically connected to a sensor interface. Preferably the pressure sensor is used for a monitoring of the pressure at the fluid consumer ports and provides an electrical signal, which is dependent from the pressure, to a sensor interface. The sensor interface may be part of the valve module and serves as a connection means to connect the pressure sensor with a processing means which processes the pressure signals.

According to a further embodiment of the invention the pressure sensor is located between the fluid switching valve and the fluid pressure regulator at the top of the first channel body section and a sensing channel is formed in the first channel body section between the pressure sensor and the third fluid channel. This arrangement of the pressure sensor allows a compact design of the first channel body portion. Furthermore a maximum distance between the fluid switching valve and the fluid pressure regulator is realized which is useful to avoid thermal influences which may occur during the operation of the valve module due to the waste heat originating from the fluid switching valve.

According to a further embodiment of the invention the fluid switching valve is formed as a 3/2-way solenoid valve.

According to a further embodiment of the invention the vacuum switching valve is formed as a 3/2-way solenoid valve.

According to a further embodiment of the invention the fluid pressure regulator is configured as a proportional pressure regulator valve having a piezo valve, a pressure sensor and an electronic controller for regulating an output pressure based on a sensor signal from the pressure sensor. The task of the pressure regulator is the precise delivery of a predefined amount of compressed air based on a signal of a machine control which controls the operation of the fluid consumer. The piezo valve, the pressure sensor and the electronic controller form a closed loop control circuit to provide the requested amount of compressed air to the fluid consumer. Due to the use of a piezo valve the fluid pressure regulator allows a quick and low-lag adaptation of the flow of compressed air. The fluid switching valve, which is arranged between the fluid pressure regulator and the fluid consumer port, serves as a cut-off valve for the case, that a quick ventilation of the fluid consumer is required, which ventilation is realised by means of the vacuum circuit and the related vacuum valve.

According to a further embodiment of the invention a plurality of valve modules are disposed in a housing and are mounted to a pressure supply bar and to a vacuum supply bar which are disposed on an inner surface of the housing, the pressure supply bar having a pressure port and a plurality of fluid outlets, the vacuum supply bar having a vacuum port and a plurality of vacuum outlets. Each of the valve modules is connected with its fluid input port to one of the fluid outlets of the pressure supply bar. Furthermore each of the valve modules may be coupled with its vacuum input port to one of the vacuum outlets of the vacuum supply bar. This allows a comfortable assembly and disassembly of the valve modules to the housing and from the housing without the necessity to connect or disconnect separate fluid tubes or hoses. The pressure port of the pressure supply bar is to be connected with a pressure source which may be a compressor or a central compressed air supply. In the same way the vacuum port of the vacuum supply bar is to be connected with a local vacuum supply or a central vacuum supply. Preferably the pressure supply bar and the vacuum supply bar are mounted on an inner surface of the housing and are oriented in a way that allows an easy assembly and disassembly of the valve modules are into the housing and from the housing. The fluid outlets and the vacuum outlets maybe realised as cylindrical bores in an even surface of the pressure supply bar and the vacuum supply bar respectively.

According to a further embodiment of the invention the pressure outlets of the pressure supply bar are arranged at a first constant pitch along a first straight line, and wherein the vacuum outlets of the vacuum supply bar are arranged at a second constant pitch along a second straight line, and wherein the first straight line and the second straight line are aligned parallel to each other and wherein the first pitch and the second pitch are identical. This allows a parallel arrangement of the valve modules with a small geometrical footprint. In particular the first constant pitch and the second constant pitch are slightly bigger than the respective extent of the valve module which results in narrow gaps between adjacently arranged valve modules. For example the first constant pitch is 11 mm and the extent of the valve module is 10 mm which results in a gap of 1 mm between adjacently arranged valve modules.

According to a further embodiment of the invention a control circuit is arranged on a rear side of the housing, wherein each of the valve modules is provided with a contact board, wherein the contact board is electrically connected to the fluid switching valve and the fluid pressure regulator and the vacuum switching valve, wherein the control circuit is assigned a plurality of connectors, each of which is designed for electrical contacting of a contact board, and wherein the control circuit is designed for electrical control of the fluid switching valve, the fluid pressure regulator and the vacuum switching valve.

The control circuit comprises a printed circuit board, at least one processor and the electronic periphery for the operation of this processor, wherein the processor includes software for the respective control of the valve modules. In particular the control circuit provides all control signals which are necessary for the operation of the fluid switching valve, the fluid pressure regulator and the vacuum switching valve as well as the electric supply for the respective components. The signals and the electric supply are provided to a contact board, which is part of the valve module and which serves as a terminal for electric connections, in particular cable connections, for the electric components of the valve module. According to a preferred embodiment the contact board is only an electromechanical interface between the electric components of the valve module and the control circuit and does not include any active or passive electrical or electronic components beyond respective contact plugs.

According to a further embodiment of the invention the control circuit includes a bus interface for connection to a bus communication system. The bus interface allows a digital bus communication between the fluid control system and a machine control, which operates the machine in which the fluid consumer and the fluid control system are incorporated. Such a machine control may be realised as a numerical control or programmable logic controller (PLC) which communicates with devices like the fluid control system by means of a bus communication system, in particular from the group: Ethercat, Devicenet, CAN, Profibus.

According to a further embodiment of the invention the fluid pressure regulator is disposed on the channel body between the fluid switching valve and the vacuum switching valve. Preferably the vacuum switching valve is located closest to the consumer port to ensure quick ventilation of the fluid consumer. The vacuum switching valve is a normally closed (NC) valve and is only operated in the case of a quick ventilation requirement and therefore does not consume electric energy most of the time, which means that the vacuum switching valve also does not influence the temperature of the compressed air which is provided to the consumer port. In contrast to this the fluid switching valve is operated regularly and therefore produces at least some waste heat which may influence the temperature of the compressed air which is provided to the consumer port. However due to the arrangement of the fluid switching valve with a maximum distance to the consumer port and the arrangement of the fluidic connection between the fluid pressure regulator, the fluid switching valve and the consumer port it is ensured that the compressed air travels a long distance between the fluid switching valve and the consumer port through the channel body and therefore the influence of waste heat to the compressed air can be diminished.

According to a further embodiment of the invention a vacuum port is disposed on the top of the channel body adjacent the vacuum switching valve and configured to individually provide a vacuum to the vacuum switching valve. The vacuum port allows an individual supply of vacuum to the respective vacuum switching valve as an alternative to the vacuum supply by the vacuum supply bar. This may of interest is a fluid consumer which is connected to the respective valve module requires a specific vacuum level and/or a high vacuum flow which cannot be provided by the vacuum supply bar. Preferably the vacuum port is equipped with a respective connector that allows a connection of a tube or hose for fluidic communication with a vacuum supply.

According to a further embodiment of the invention a fluid filter is associated with the fluid consumer port. The fluid filter ensures a retention of particles which may be provided in the compressed air flowing through the valve module and must not enter the fluid consumer as well as a retention of particles which may originate from the fluid consumer and must not enter the vacuum system.

BRIEF DESCRIPTION OF THE DRAWINGS

A preferred embodiment of the invention is shown in the drawings.

DETAILED DESCRIPTION

Figure 1:
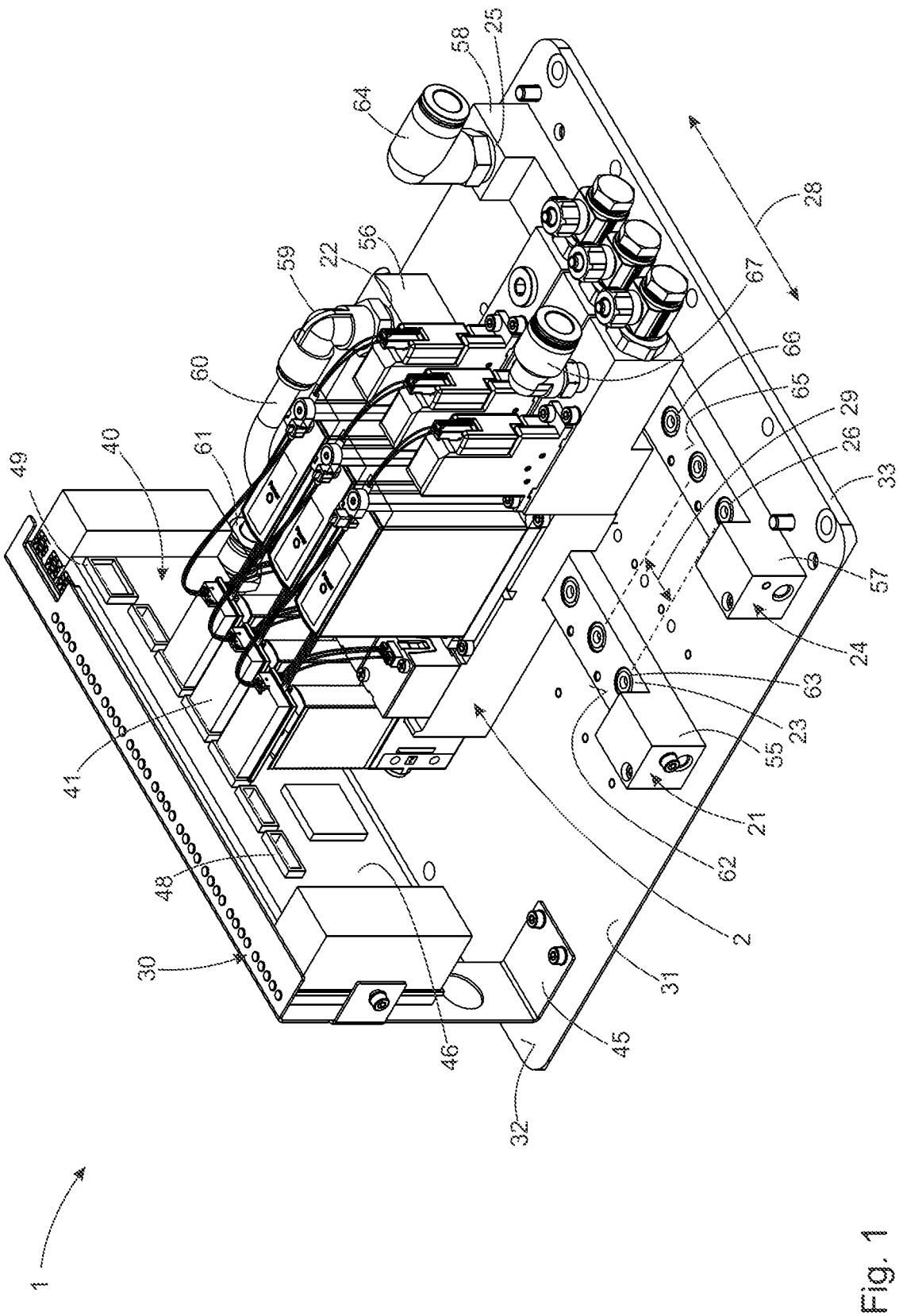
FIG. 1 shows a perspective view on a fluid control system comprising a housing and several valve modules mounted on a pressure supply bar and a vacuum supply bar.

A fluid control system 1 according to FIG. 1 comprises a housing 30, which is shown in a disassembled state, therefore only a base plate 31 is represented in FIG. 1, whereas a cover for the base plate 31 is not shown.

The fluid control system 1 comprises several valve modules 2, each being an assembly group which can be handled, operated and tested separately and which can be mounted into the housing 30 or disassembled from the housing 30 by an end-user of the fluid control system 1.

The fluid control system 1 also comprises a control circuit 40, which is mounted by means of respective supports 45 to the base plate 31 and which comprises a printed circuit board 46 which is equipped with a processor, e.g. a microcontroller, and further electronic and electrical components (not shown) to form an electronic circuit to control the function of the valve modules 2. Furthermore the printed circuit board 46 is equipped with plug connectors 48 which are arranged in a row and which serve for an electric connection with the valve modules 2. Another plug connector 49 may be used for a connection of the control circuit 40 to a bus communication system.

An upper surface 32 of the base plate 31 is equipped with a pressure supply bar 21 which extends with a rectangular profile along an extension axis 28, which is oriented parallel to a width of the base plate 31. A left end region 55 and a right end region 56 of the pressure supply bar 21 are both shaped as rectangular blocks. A pressure port 22 located at the right end region 56 is equipped with an elbow fitting 59, which is connected with a tube 60 and a fluid coupling 61 that allows a connection of the pressure supply bar 21 with a pressure supply (not shown) by means of a tube or hose (not shown). The pressure supply bar 21 has an even surface 62 which is equipped with fluid outlets 23, which are arranged along the extension axis 28 with a constant pitch 29. Each of the fluid outlets 23 is realised as a bore which is oriented perpendicularly to the even surface 62 and which is surrounded by an o-ring seal 63. Preferably each of the fluid outlets 23 is realised as a threaded bore that allows the assembly of a screw (not shown) for individually sealing the respective fluid outlet 23, if this fluid outlet 23 is not in use.

Furthermore the upper surface 32 of the base plate 31 is equipped with a vacuum supply bar 24 which extends with a rectangular profile along an extension axis 28 and is oriented parallel to the pressure supply bar 21. A left end region 57 and a right end region 58 of the vacuum supply bar 21 are both shaped as rectangular blocks. A vacuum port 25 located at the right end region 58 is equipped with an elbow fitting 64, which allows a connection of the vacuum supply bar 24 with a vacuum supply (not shown) by means of a tube or hose (not shown). The vacuum supply bar 24 has an even surface 65 which is equipped with vacuum outlets 26, which are arranged along the extension axis 28 with the same constant pitch 29 as the fluid outlets 23. Each of the vacuum outlets 26 is realised as a bore which is oriented perpendicularly to the even surface 65 and which is surrounded by an o-ring seal 66. Preferably each of the vacuum outlets 26 is realised as a threaded bore that allows the assembly of a screw (not shown) for individually sealing the respective vacuum outlet 26, if this vacuum outlet 26 is not in use.

To allow an individual vacuum supply for a valve module 2 each of the valve modules is equipped with a supply port 77 which is located on an upper surface 38 of the channel body 3. According to FIG. 1 one of the supply ports 77 is equipped with an elbow fitting 67, whereas the other supply ports 77 are closed with a respective screw 78.

The pressure supply bar 21 and the vacuum supply bar 24 serve as interfaces for the fluidic coupling of the respective valve modules 2, in which are explained in more detail below.

Each of the valve modules 2 as shown in FIG. 1 has the same configuration of components, therefore the following explanation of the valve module 2 is valid for all valve modules 2 of the fluid control system 1 according to FIG. 1.

The valve module 2 comprises a channel body 3, a fluid switching valve 4, a fluid pressure regulator 5, a vacuum switching valve 6 and a pressure sensor 14. The fluid switching valve 4, the fluid pressure regulator 5, the vacuum switching valve 6 and the pressure sensor 14 are electromechanical fluid components which are operated with electric energy and which serves to control fluid flows to a fluid consumer port 12 and from the fluid consumer port 12 respectively. As can be seen from FIG. 1 the fluid consumer port 12 of is equipped with a hose coupling 36 which allows the connection of a flexible hose (not shown), which is to be connected with a fluid consumer, in particular an actuator (not shown). The fluid consumer port 12 is located on an end face 16 of the channel body 3, which also may be called a front face and which is located adjacent to a front face 33 of the base plate 31. This allows an easy access to the hose couplings 36 even if the cover of the housing 30 is connected with the base plate 31.

Figure 2:
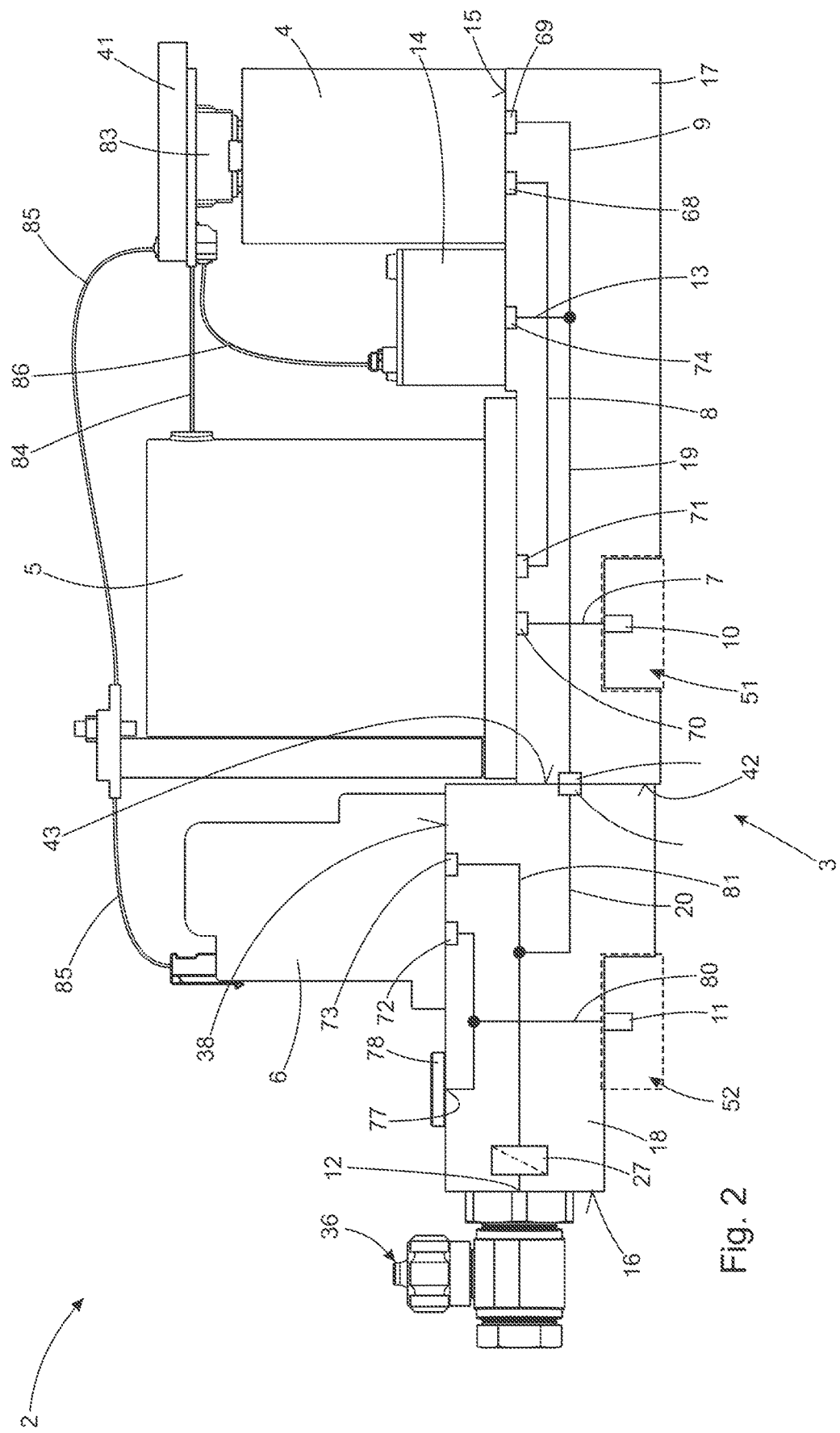
FIG. 2 shows a side view of a valve module with a partially cut channel plate.

According to FIGS. 1 and 2 the fluid switching valve 4 is connected with the contact board 41 by means of a connector 83. The fluid pressure regulator 5 is connected with the contact board 41 by means of a connecting cable 84. The vacuum switching valve 6 is connected with the contact board 41 by means of a connecting cable 85 and the pressure sensor 14 is connected with the contact board 41 by means of a connecting cable 86.

As can be seen from FIGS. 1 and 2 the channel body 3 comprises a first channel body portion 17 and a second channel body portion 18. The first channel body portion 17 mainly serves for the handling of compressed air and therefore the fluid switching valve 4, the fluid pressure regulator 5 and the pressure sensor 14 are located on an upper face 15 of the first channel body portion 17. The second channel body portion 18 mainly serves for the handling of vacuum and therefore the vacuum switching valve 6 is located on the upper surface 38 of the second channel body portion 18. However the second channel body portion 18 also carries the hose coupling 36 mounted to the fluid consumer port 12.

The first channel body portion 17 comprises a first fluid channel 7 which extends from a fluid input port 10 located in a first recess 51 having a rectangular profile which is adapted to the profile of the pressure supply bar 21. The fluid input port 10 is realised as a short tube which is to be plugged into one of the fluid outlets 23 of the pressure supply bar 21. The first fluid channel 7 is connected with an input port 70 of the fluid pressure regulator 5 and therefore allows a supply of compressed air from the pressure supply bar 21 to the fluid pressure regulator 5. The first channel body portion 17 also comprises a second fluid channel 8 which extends from an output port 71 of the fluid pressure regulator 5 to an input port 68 of the fluid switching valve 4. Furthermore a first portion 19 of a third fluid channel 9 extends from an output port 69 of the fluid switching valve 4 to a first second channel body interface 42 of the first channel body portion 17. In addition a fourth fluid channel 13 extends from the first portion 19 of the third fluid channel 9 to an input port 74 of the pressure sensor 14.

A second portion 20 of the third fluid channel 9 penetrates the second channel body portion 18 between a second channel body interface 43 and the end face 16. The second channel body interface 43 is located opposite to the first channel body interface 42 of the first channel body portion 17. In particular the first channel body interface 42 and the second channel body interface 43 both have even surfaces which are connected with each other in an airtight manner such that compressed air provided by the fluid switching valve 4 can be piped to the fluid consumer port 12. In addition a first vacuum channel 80 extends from a vacuum input port 11 which located in a second recess 52 having a rectangular profile which is adapted to the profile of the vacuum supply bar 24 to an input port 72 of the vacuum switching valve 6. The vacuum input port 11 is realised as a short tube which is to be plugged into one of the vacuum ports 25 of the vacuum supply bar 24. Furthermore a second vacuum channel 81 extends from an output port 73 of the vacuum switching valve 6 to the fluid consumer port 12. As can be seen from the schematic representation in FIG. 2 a fluid filter 27 is arranged in the second vacuum channel 81.

Figure 3:
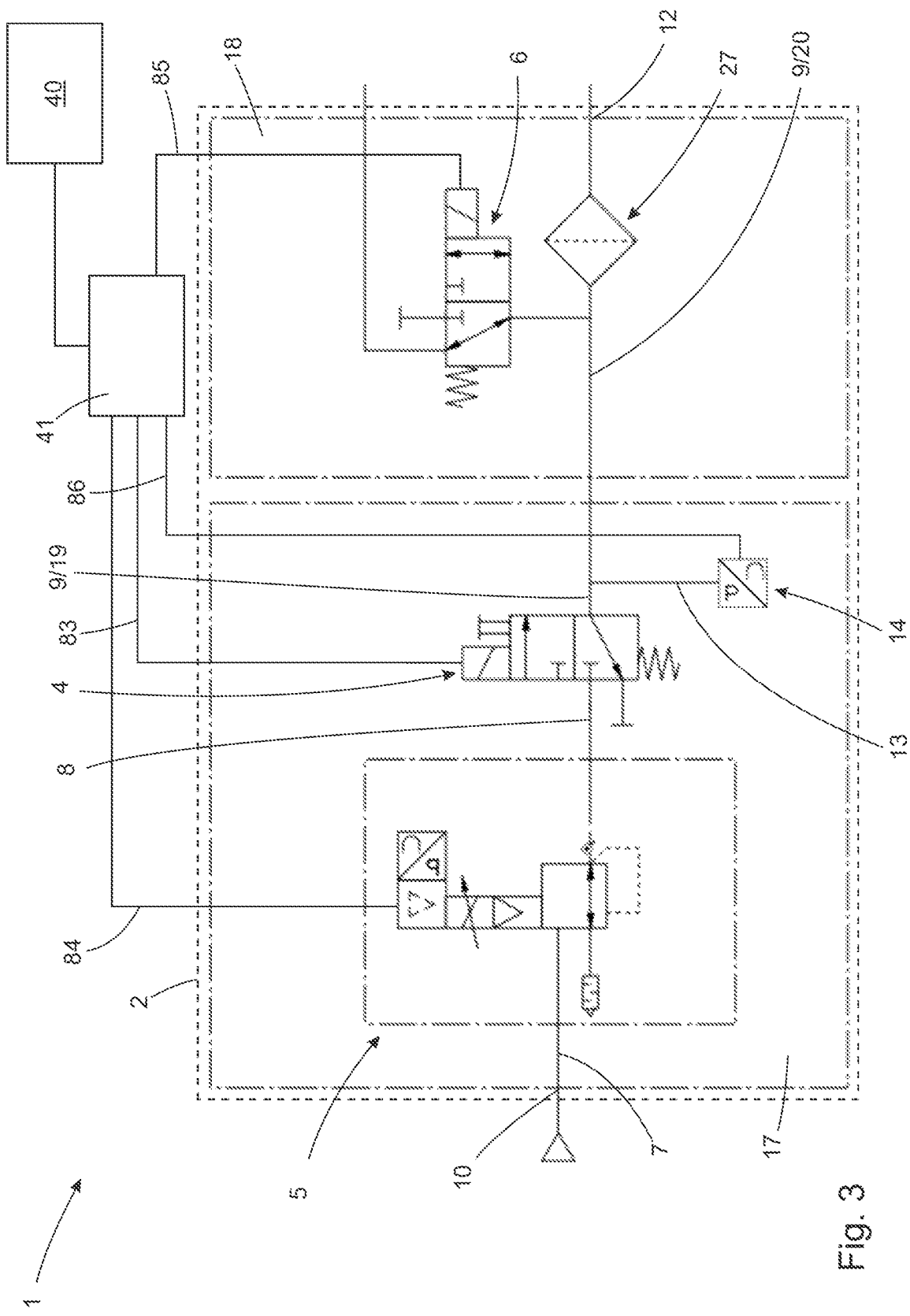
FIG. 3 shows a pneumatic diagram of the valve module.

The fluid connections between the components fluid switching valve 4, fluid pressure regulator 5, vacuum switching valve 6 and fluid consumer port 12 are symbolised by the respective symbols in FIG. 3.

What is claimed is:

1. A fluid control system for supplying fluid to a fluid consumer, comprising a valve module including a channel body to which a fluid switching valve, a fluid pressure regulator and a vacuum switching valve are attached, the channel body having a first fluid channel extending from a fluid input port to an input port of the fluid pressure regulator and having a second fluid channel extending from an output port of the fluid pressure regulator to an input port of the fluid switching valve, and having a third fluid channel extending from an output port of the fluid switching valve to a fluid consumer port, and having a first vacuum channel extending from a vacuum input port to an input port of the vacuum switching valve, and having a second vacuum channel extending from an output port of the vacuum switching valve and joining the third fluid channel upstream of the fluid consumer port,
wherein a plurality of valve modules are disposed in a housing and are mounted to a pressure supply bar and to a vacuum supply bar which are disposed on an inner surface of the housing, the pressure supply bar having a pressure port and a plurality of fluid outlets, the vacuum supply bar having a vacuum port and a plurality of vacuum outlets.

2. The fluid control system of claim 1, wherein the pressure outlets of the pressure supply bar are arranged at a first constant pitch along a first straight line, and wherein the vacuum outlets of the vacuum supply bar are arranged at a second constant pitch along a second straight line, and wherein the first straight line and the second straight line are aligned parallel to each other and wherein the first pitch and the second pitch are identical.

3. The fluid control system of claim 1, wherein the fluid input port in the channel body is connected to the pressure outlet in the pressure supply bar, and wherein the vacuum input port in the channel body is connected to the vacuum outlet in the vacuum supply bar.

4. The fluid control system according to claim 1, wherein a control circuit is arranged on a rear side of the housing, wherein each of the valve modules is provided with a contact board, wherein the contact board is electrically connected to the fluid switching valve and the fluid pressure regulator and the vacuum switching valve of each valve module, wherein the control circuit is assigned a plurality of connectors, each of which is designed for electrical contacting of a contact board, and wherein the control circuit is designed for electrical control of the fluid switching valve, the fluid pressure regulator and the vacuum switching valve of each valve module.

5. The fluid control system of claim 4, wherein a plurality of valve modules are mounted on the pressure supply bar and the vacuum supply bar in parallel with each other.

6. The fluid control system of claim 5, wherein the control circuit includes a bus interface for connection to a bus communication system.

* * * * *